United States Patent [19]

Fang et al.

[11] Patent Number: 4,736,572
[45] Date of Patent: Apr. 12, 1988

[54] AUTOMATED POUCH FILLER

[75] Inventors: Jin-Liou Fang, Chatsworth; Dayne I. Shigematsu, Arleta, both of Calif.

[73] Assignee: Carnation Company, Los Angeles, Calif.

[21] Appl. No.: 301,222

[22] Filed: Sep. 11, 1981

[51] Int. Cl.[4] ............................................. B65B 31/00
[52] U.S. Cl. ...................................... 53/512; 53/564
[58] Field of Search ................. 53/434, 512, 562, 110, 53/564

[56] References Cited

U.S. PATENT DOCUMENTS

| | | | |
|---|---|---|---|
| 2,928,216 | 3/1960 | Orsini | 53/434 |
| 3,182,432 | 5/1965 | Canfield | 53/512 |
| 3,430,414 | 3/1969 | Ludwig | 53/512 X |
| 3,469,364 | 9/1969 | Bischoff | 53/434 X |
| 3,619,975 | 11/1971 | Johnson | 53/512 |
| 3,708,952 | 1/1973 | Schulze | 53/512 |

*Primary Examiner*—A. J. Heinz
*Attorney, Agent, or Firm*—Beehler, Pavitt, Siegemund, Jagger, Martella & Dawes

[57] ABSTRACT

The performance of an automated pouch filler to fill institutional quantity sized bags of foodstuff can be improved by maintaining the sealing edge of the filled bag under tension during the sealing of the bag. Unwanted air can also be removed from the bag by utilization of a pair of squeeze bars to momentarily push excess air from the bag or by evacuating air from the bag through a vacuum tube in combination with soft sealing bars to temporarily close the bag during this evacuation. The top sealing edge is maintained under tension by use of a spring loaded clamp which attaches to one corner of the bag. The rejection rate of seal is dramatically decreased by providing a neck on the bag to form a partially presealed bag which is then sealed along a segment of the top edge of the bag after filling. The rejection rate is also dramatically decreased by sealing the top edge under tension. Laminated bags having an inner and outer bag can be utilized in the presealed configuration which particular advantage if the inner, free bag is tacked to the outer bag at the neck portion of the laminated bag, which inner and outer bags comprise the laminated bag at the neck portion of the laminated bag.

15 Claims, 4 Drawing Sheets

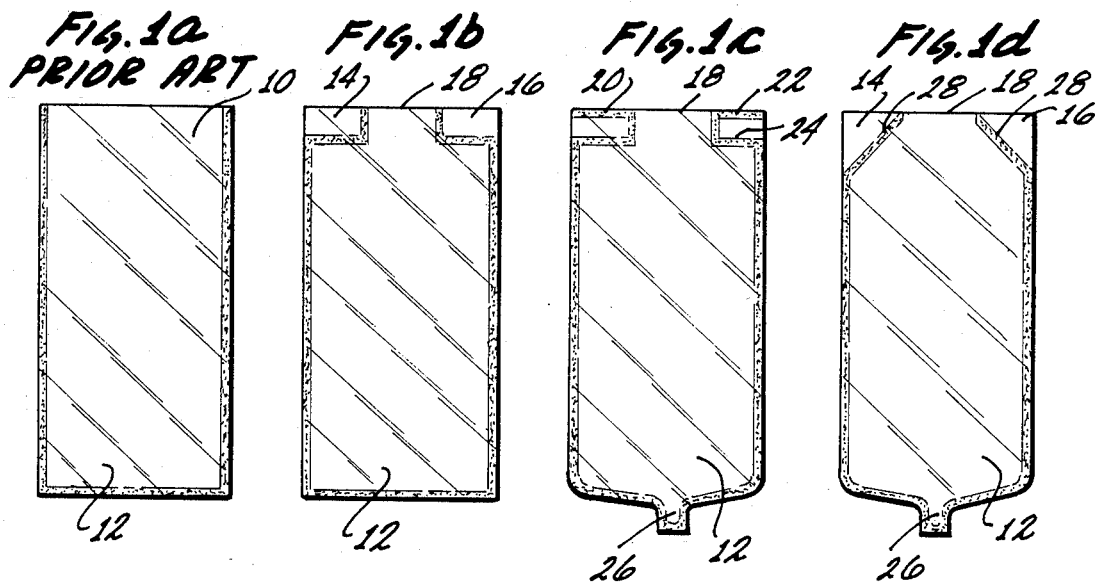
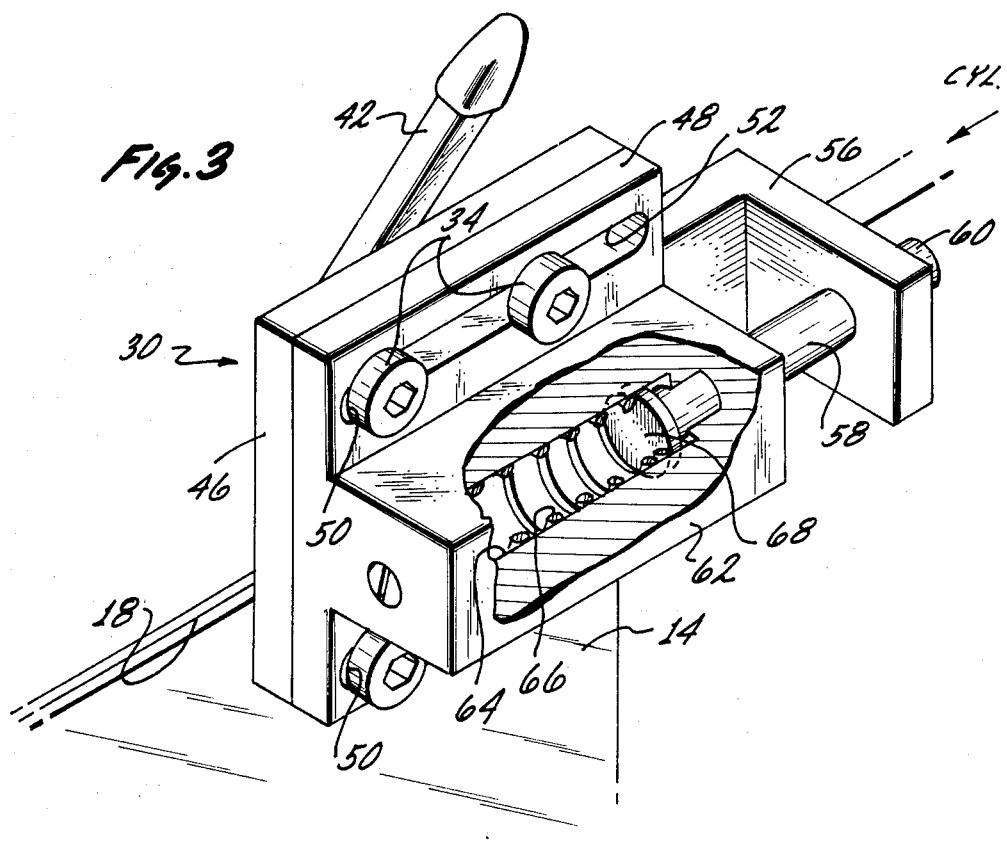

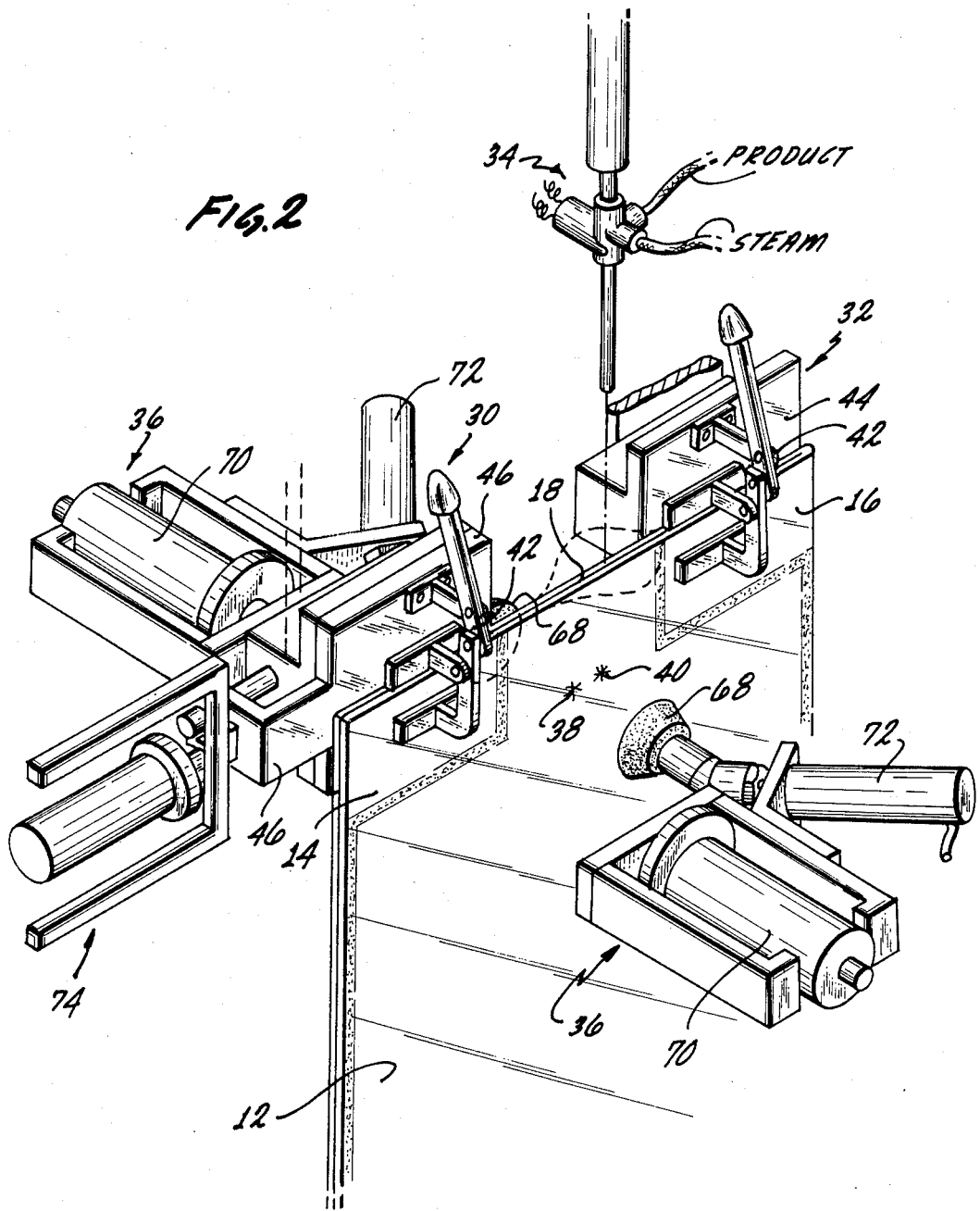

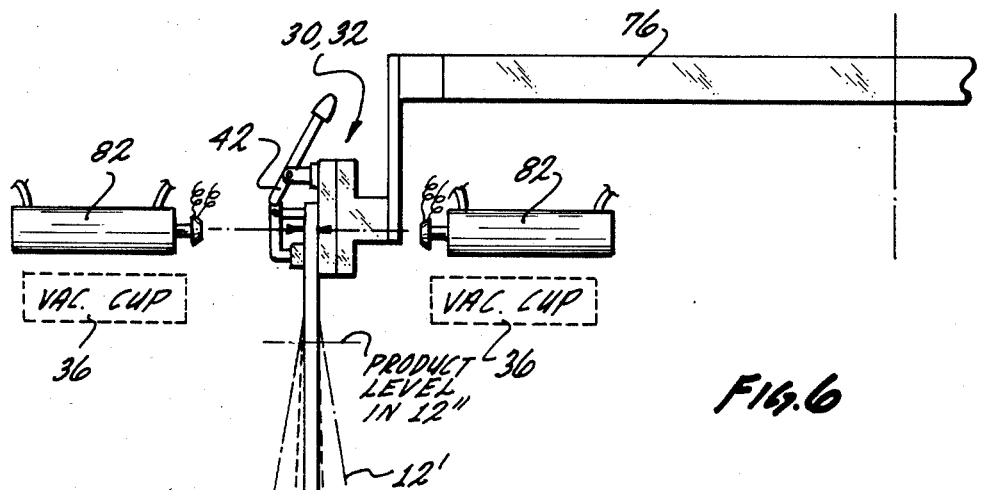
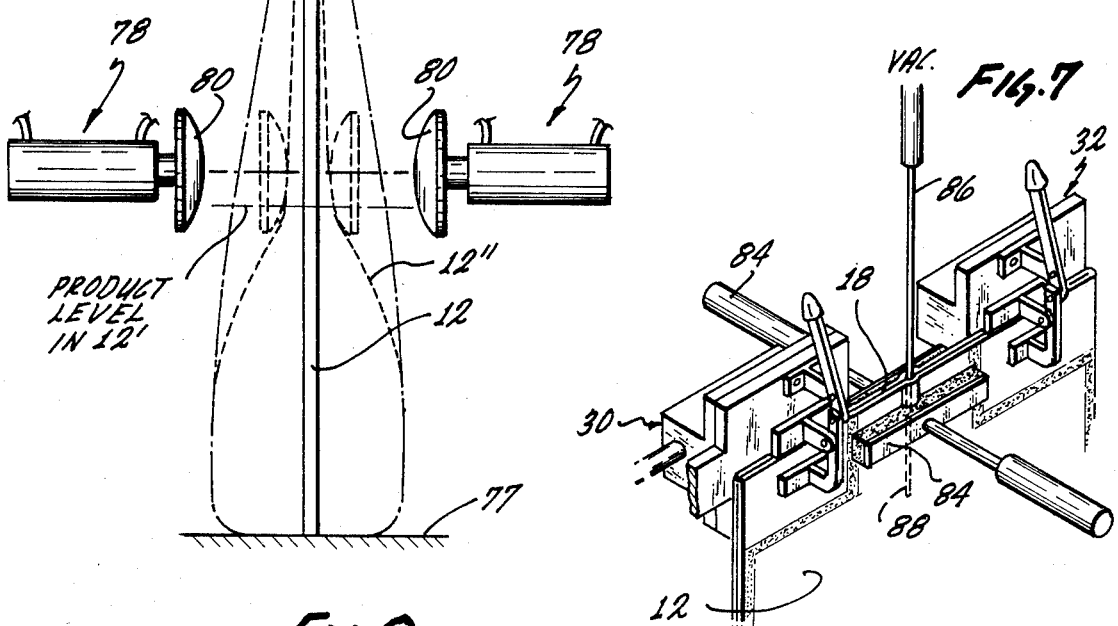
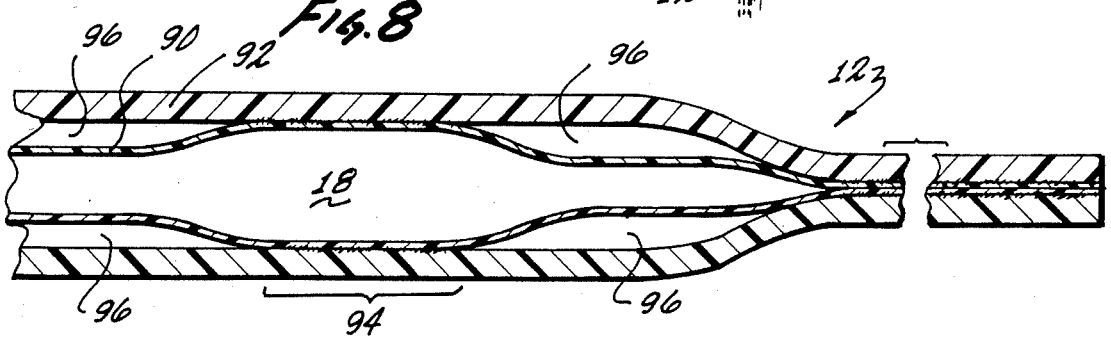

AUTOMATED POUCH FILLER

BACKGROUND OF THE INVENTION

1. Field of the Invention

The present invention relates to the field of automated packaging equipment and in particular relates to bag filling equipment used to fill large flexible bags with fluidic, semifluidic or mixtures of solid and fluidic foodstuffs.

2. Description of the Prior Art

Generally, institutional quantities of foodstuff are packaged in conventional, rigid cans. Flexible bags have been used for foodstuff primarily for individual, consumer quantities, such as individual servings of ketchup, mayonnaise or other condiments. As a result, foodstuff packaged in pound or smaller size bags are filled and sealed by machines which can handle only those bags designed for small weights, and volumes. This type of food packaging machinery is totally inadequate for filling and sealing bags for institutional customers, which bags may contain thirty pounds or more of foodstuff. Additionally, bags large enough to contain thirty pounds of foodstuff necessarily include a large sealing area and usually entrap a relatively large volume of air. Any defect or wrinkle in the seal, which defect or wrinkle may be exaggerated by the large weight of foodstuff contained within the bag or any large volume of air left within the bag, can easily cause rapid deterioration and/or spoilage of the foodstuff. The resulting loss in an institutional size bag can be a significant loss. Therefore, unless the seal is made and the air removed from the bag with a high degree of reliability, a flexible bag will be unsuitable for institutional quantities of foodstuff. For this reason large size, flexible bags have been used only with specialized and expensive spouts or seal mechanisms.

What is needed then is an apparatus for filling and sealing large flexible bags without special sealing mechanisms such that the seal is perfectly formed with a high degree of reliability and such that a means is devised to remove air entrapped within the bag.

BRIEF SUMMARY OF THE INVENTION

The present invention is an improvement in an apparatus for filling flexible bags comprising a first fixed clamp secured to one corner of the bag. A movable second clamp is secured to an opposing corner of the bag. An edge of the bag is stretched between the clamps. That edge is unsealed to permit filling of the bag. A first means for urging the movable clamp away from the opposing corner is included in order to maintain the edge of the bag between the clamps in a closed condition and under tension at least during the sealing operation with respect to that edge.

The invention may further include a second means for displacing the movable clamp towards the fixed clamp in order to open the bag to facilitate filling.

In another embodiment of the present invention a pair of squeeze bars is included with at least one of the squeeze bars being movable towards the other. The bag is filled with an air degradable material such as the foodstuff and the squeeze bars are arranged and configured to squeeze the bag to force the material upward toward a single opening means provided in the top of the bag.

Another means for removing the air from the bag may be comprised of a pair of soft sealing bars, at least one of which is movable towards the other. The bag is positioned between two sealing bars and a suction tube is disposed into the bag and between the sealing bars. The soft sealing bars move together to seal the bag and form a closure around the tube. Air is evacuated from the bag by the tube. The bag is then permanently sealed after the tube is removed.

The present invention also includes the improvement wherein the top edge of the bag is presealed except for a central segment through which segment the bag is filled. Clamps attaching to the corners of the bag at the presealed portions with the unsealed segment lying between the clamps. The corners are drawn together by at least one of the clamps to open the bag and then stretched outward by the clamps to maintain the top edge under tension while it is sealed. The bag contains an inner and outer bag subpart wherein the inner bag is unattached to the outer bag except where presealed along the edges forming the seams. In addition, the inner bag is tacked to the outer bag on each side at a point in the central segment which performs the top opening or neck. Tacking of the inner bag to the outer bag at this point permits reliable opening of the bag such that the inner bag opens in the same manner as the outer bag to permit automated filling within the inner bag rather than accidental filling in the space between the inner and outer bags.

The present invention also includes the improvement wherein a pair of suction cups are provided. The first means displaces the cups in a mutually opposing direction along the common line which is substantially perpendicular to the plane defined by the bag when the bag is flat and unopened. A second means which is coupled to the first means displaces the cups along the line inclined and intersecting the common line at such an angle as to permit displacement of the cups at least in part in a direction parallel to the plane defined by the bag when it is flat and unopened. One corner of the bag is fixed and the other is moved horizontally such that the center of the bag moves horizontally as well. The cups which are attached to a central point on the bag, draw the bag open and move horizontally as the bag is opened in order to maintain the suction points without side tension.

These and other embodiments of the present invention including advantages obtained by combination of these elements are better understood by viewing the following figures where like elements are referenced by like numerals.

BRIEF DESCRIPTION OF THE DRAWINGS

FIGS. 1a–d illustrate a prior art bag in FIG. 1a and improved, presealed bags in FIGS. 1b–1d as used in the present invention.

FIG. 2 illustrates in simplified form a combination of the clamps and suction cup with a presealed bag.

FIG. 3 shows a partially cut-away view the detail of the movable clamp shown in FIG. 2.

FIG. 6 is a side view of the bag held by clamps of the present invention showing squeeze bars used to force surplus air from the bag.

FIG. 7 is an alternative embodiment of the present invention wherein soft sealing bars and a vacuum tube is used to remove air from the bag.

FIG. 8 is a top cross section of the bag as it is composed of an outer and inner bag showing the tacking of the inner bag at the central open portion of the outer bag.

DETAILED DESCRIPTION OF THE PREFERRED EMBODIMENTS

Figure 4:
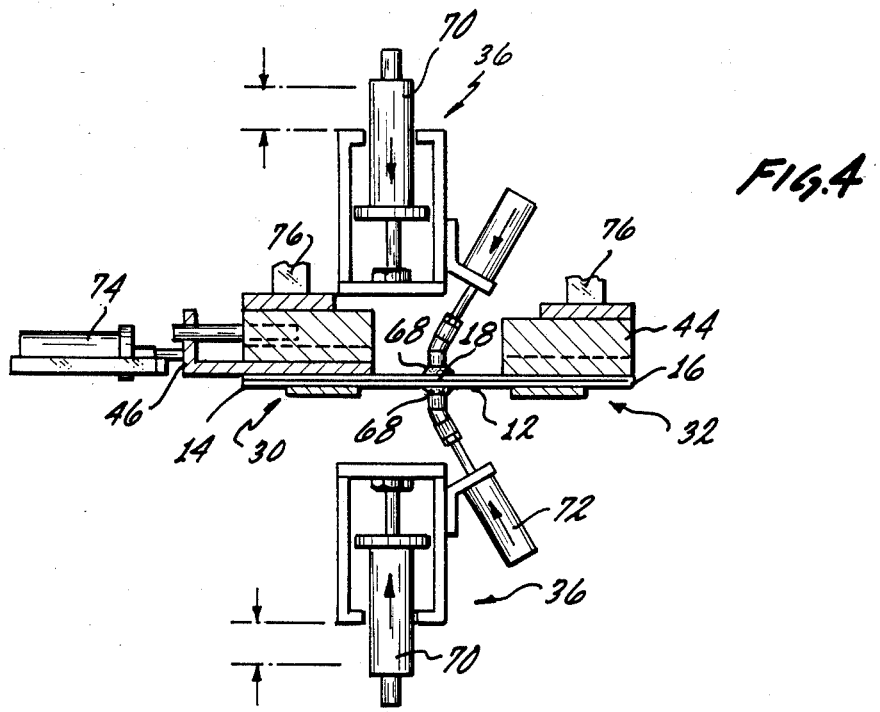
FIG. 4 is a top plan view of the clamps and suction bar combination shown in FIG. 2 at a time when the suction cups first contact the bag.

The present invention is an automated bag filler used to fill large institutional size bags with foodstuffs. As is well known in the art, the present invention is a rotatable multi-stationed apparatus wherein a bag is clamped to a specific station with a pair of clamps described below and then rotated to a first filling station. Suction cup openers, again as described below, attach to the bag and open the bag in conjunction with the clamps. The bag is then filled with a first food material. The assembly rotates to a second position where a second material may be placed within the bag. Typically, vegetable bits may be placed during the first station and a fluid placed at the second filling station. The apparatus again rotates to a third station where the air is removed from the interior of the bag and the bag is sealed. The apparatus then rotates back to the first station where the bag is removed manually by an operator and replaced by a new bag to be cycled through the same process. Multistation rotating apparatus per se are well known to the art and an example of one may be seen in R. W. Vergobbi et al, U.S. Letters Patent No. 2,754,644 wherein more than four stations are included. Therefore, the rotatable subpart of the pouch filler will be illustrated or described only to the extent necessary to show its coupling or relation to the present invention.

When foodstuffs are handled, it is important that the perfection of the bag seal be ensured and maintained. Air borne bacteria readily finds its way into food seals and unless the integrity of the seal is perfect, entry into the interior of the food container is nearly certain. The resulting spoilage of the food generally renders the food unusable. In the case of small individual servings, the amount of food loss in any such instance is negligible. However, when thirty pounds or more food is contained within a container, its loss is a significant one and the requirement that the seal be perfect is even greater. The difficulty of making a seal on a large bag arises both from the inherently greater area which must be sealed but also from the size and weight of material contained within the bag, which weight introduces stresses, strains and wrinkles in the sealing area prior to effectuation of the seal.

FIG. 1a illustrates a typical prior art bag used for packaging foodstuff in institutional quantities. Such bags were used with foodstuff not susceptible to air spoilage, such as flour, dried beans and vegetables and other such foodstuffs. Typically the bags are air permeable as well, being made of cloth or loosely sealed paper. In any case, the requirement for air tight sealing was virtually nonexistent along the entire top edge of a prior art bag, which edge was left open and unsealed.

FIGS. 1b-1d illustrate various embodiments of a presealed bag used as part of the combination of the present invention. FIG. 1b illustrates the simplest form of bag 12 wherein corners 14 and 16 have been presealed however by conventional means, to produce an open central segment 18 through which bag 12 is filled.

FIG. 1c represents an alternative embodiment where the seal, which is represented by the heat sealed band 20 is formed at both the upper 22 and lower 24 portions of top edge 10 of bag 12. In the embodiment illustrated in FIG. 1c bag 12 has further been modified to include a spout 26 which can be cut when the bag is placed in an appropriate dispenser to allow for convenient extraction.

FIG. 1d illustrates yet another embodiment wherein corners 14 and 16 are sealed by a slanted sealing area 28 to form neck 18.

Use of any of the embodiments illustrated in FIGS. 1b-1d as described below provides the substantial advantage of allowing a large bag 12, to be provided with a seal across the entire top edge 10 of bag 12. The difference in the seal length between neck 18 and top 10 is critical in order to achieve the low rejection rates required for an air tight bag for use with the foodstuffs. A rejection rate of less than 0.1% must be maintained by bags containing institutional quantities of food stuff. Bags containing this volume of foodstuff cannot be sealed with acceptable reliability if the seal is of the form or length which would be required by a bag of the configuration illustrated in FIG. 1a.

Figure 5:
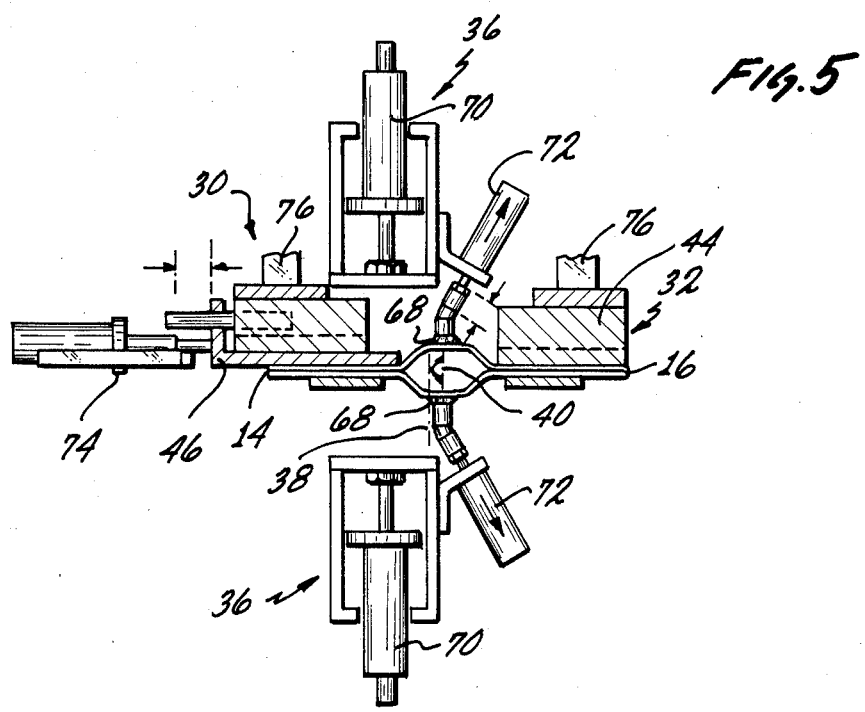
FIG. 5 is a top plan view of the elements illustrated in FIG. 4 after the suction cups have moved outwardly to open the bag and the movable clamp is moved inwardly to allow the bag center to shift.

FIG. 2 illustrates the immediate environment in which bag 12 is used in conjunction with other elements of the present invention. Bag 12 is held in place by a movable clamp 30 and a fixed clamp 32 which attach to corners 14 and 16 of bag 12 respectively. Central neck portion 18 forms an edge of bag 12 between clamps 30 and 32. A suction mechanism 36 replicated on each side of the bag 12 is actuated as described in greater detail below. The suction cups 36 attach themselves to bag 12 on a center line 38 below neck 18. As the suction cups 36 are withdrawn, causing bag 12 to open as shown in dotted outline in FIG. 2, the center of bag 12 will move to the right to position 40 since clamp 32 is fixed and clamp 30, as described below in greater detail, is movable. In fact, clamp 30 is operated by an actuator 42 to move to the right to cause the opening of the bag 12. A filler mechanism 34 is then inserted into bag 12 at its opened center 40, and bag 12 is then filled. FIGS. 2 and 5 illustrate the position and condition of bag 12 at a filling station. The initial station at which the bag 12 is inserted into the pouch filler is identical except that filler mechanism 34 and vacuum suction mechanisms 36 are provided only at the filler stations and do not rotate with the bag and clamp assembly.

Clamps 30 and 32 as shown in FIG. 2 are both locking toggle clamps or Davis toggle clamps utilizing a compound lever assembly 42 to tightly secure corners 14 and 16 to a rotating station attachment point. The attachment point for clamp 32 being a fixed plate 44 and the attachment point for clamp 30 being a movable plate 46. The coupling of plates 44 and 46 are shown in FIG. 6 to an arm 76 which in turn is coupled to a central rotating axis.

The rear view of clamp 30 is illustrated in cutaway view in FIG. 3. Compound toggle lever 42 is just visible as it protrudes over attachment plate 46. Attachment plate 46 is movable with respect to a fixed plate 48 which is coupled with the rigid rotating assembly, not illustrated, which rotates each bag through the various stations. In the preferred embodiment, attachment plate 46 is movable by means of a pin and slot combination 50, the upper part of which is illustrated in FIG. 3 as including slot 52 and pins 54. Plate 46 has an extension 56 which is fixed to a rod 58. End 60 of rod 58 contacts an actuator not shown in FIG. 3 but is shown as actuator 42 in FIG. 2. As shown in FIG. 3 rod 58 extends into a spring retaining block 62 forming a part of stationary plate 48. Block 62 is ultimately coupled to arm 76 in FIG. 6 which rotates the station and maintains block 62 stationary when set in an assigned station. Block 62 is provided by an internal cylinder 64 which contains a compression spring 66 bearing on one end against a flattened head 68 forming the opposing end of rod 58. Thus, when actuator 42 contacts end 60 of rod 58 spring 66 is compressed and plate 46 moved to the left, as shown in FIG. 3. When actuator 42 is removed, spring 66 will return to plate 46 to its initial configuration.

Rod 58 may be displaced within block 62 by varying amounts. Thus, when the bag is placed on the clamps at the loading or initial station, the operator presses a foot pedal to activate actuator 42 which causes plate 46 and compound clamp 42 to be moved to the left, as shown in FIG. 3, by a first predetermined amount. The bag is then placed in the clamps and the clamps secured. Thus, as the bag moves to the filling and sealing stations, clamp 30 constantly maintains a tension accross the top edge or neck 18 of bag 12. Clamp 30 is also used to open the bag when rod 58 is displaced by a second predetermined and greater amount.

FIGS. 4 to 5 more clearly illustrate the inneraction of the clamps 30 and 32 to open the bag and their cooperation with suction cup mechanisms 36. FIG. 4 shows a plan view of the elements illustrated in perspective view in FIG. 2 after the time at which suction cup mechanism 36 has been activated to cause suction cups 68 to attach to bag 12 at point 38. Suction cup mechanism 36 is comprised of a first actuator 70 which moves the suction cups along a line substantially perpendicular to the plane of bag 12, as defined by bag 12 when bag 12 is flat and unopened. A second actuator 72 is included within mechanism 36 and is orientated at an angle with respect to the line of action of actuator 72. In the preferred embodiment the angle is approximately 30 degrees. FIG. 5 illustrates bag 12 after it has been opened by the retraction of suction cups 68 by actuators 72. Although the illustration in FIG. 5 shows the opening of bag 12 totally by the action of inclined actuators 72 and movable clamp 30, it is entirely within the scope of the present invention that both actuators 70 and 72 may operate to move suction cups 68 inward to attach to bag 12 at point 38, and then actuators 72 move outward to cause the opening of bag 12 at neck 18. At the same time as suction cups 68 are moved outward, clamp 30 is moved inward by actuators 74 by an additional amount to allow corner 14 to approach corner 16. When bag 12 opens, the center of bag lies not along line 38 but along line 40 as caused by the displacement of corner 14 through the action of clamp 30. Clamp 30 as shown in FIGS. 4 and 5 is attached arm 76, illustrated as a cutaway portion, which arm forms part of the rotatable turret.

But for the fact that the line of action of actuator 72 is inclined with respect to the line of action of actuator 70, the attachment of suction cup 68 to bag 12 might otherwise be lost. In other words, as the center of bag 12 is shifted, so must suction cups 68 be shifted. This is permitted by the appropriate angular orientation of actuator 72 to introduce the required horizontal shift along the line of action of the actuator.

Another embodiment of the present invention is shown in side view in FIG. 6 where bag 12 is filled with a flowable foodstuff and thus assumes the shape 12'. A support tray 77 is provided at the bottom of bag 12 and is coupled to arm 76. Tray 77 supports the weight of bag 12 when filled with foodstuff thereby releaving the remaining portions of the apparatus from the large downward pull of a fully loaded bag 12. Support of part of the weight of loaded bag 12 also facilitates the efficient operation of squeeze bars 78. Squeeze bars 78 are provided on each side of bag 12' and include a squeeze bar head 80 which may be a fat bar or may assume a half round or other shape as illustrated in FIG. 6. Heads 80 move inwardly on each side of bag 12' to cause bag 12' to assume the shape as shown as 12''. The flowable material contained within bag 12' flows upward under the action of squeeze bars 80 to cause air contained within the bag 12' to be expelled through neck 18. The amount of material in bag 12' and the action of squeeze bar mechanism 78 can be controlled such that material within bag 12' rises to a point just below the sealing line and neck 18. Neck 18 is then sealed by conventional heat seal bars 82 while squeeze bars 78 maintain the bag in the form 12''. After the bag has been sealed, squeeze bars 78 are retracted and the bag resumes the shape of 12'. The bag is then rotated to the loading and unloading or initial station where the filled bag is manually moved and a new bag is put in place to repeat the sequence of stations.

An alternative means for evacuating the unwanted air from bag 12 is illustrated in FIG. 7. When bag 12 has been filled and is rotated to the sealing station, soft sealing bars 84 are actuated to squeeze neck 18 shut. However, prior to the actuation of soft bars 84, a thin vacuum tube 86 is inserted in neck 18. Soft bars 84 thus both temporarily seal neck 18 and form a closure around vacuum tube 86. Air is drawn from bag 12 through tube 86 and then conventionally sealed by heat bars, such as bars 82 shown in FIG. 6. The heat bars are actuated to form a seal at a point either below the lowest extension 88 of tube 86, or tube 86 is withdrawn to allow the heat seal bars 82 to enter at a point just below soft sealing bars 84. In the latter case, soft sealing bars 84 remain in place to maintain the vacuum closure of neck 18 until a permanent seal can be effected.

FIG. 8 illustrates an improvement in a multi layer bag which can be used as part of the combination of the present invention. Typically, food bags contain an inner bag 90 which has qualities adapted for the containment of food, and an outer bag 92 which has the desired mechanical properties. For example, inner bag 90 may consist of a polypropylene bag adapted for contact with foodstuff, while other bag 92 may be comprised of a glued laminate of an inner polypropylene layer, an illuminium foil layer, and a nylon outer layer. Thus, the outer bag provides a strong physical containment and has an inner thin layer which is chemically compatible with inner bag 90. However, such a multilayered bag cannot be used as part of the combination in the present invention unless care is taken to tack inner bag 90 at the central neck 18 to outer bag 92.

This is shown in FIG. 8 as a conventional thermal tacking of bags 90 and 92 along a portion 94 common to both bags. Thus, when bag 12 is opened by suction cup attachment to outer bag 92, inner bag 90 will open in the uniform manner thereby reliably allowing the automated insertion of filler mechanism 34 to the interior of bag 90 rather than accidental insertion into the open space 96 between bags 90 and 92.

Many modifications and alterations may be made by one having ordinary skill in the art without departing from the spirit and scope of the present invention. For example, the actuators of the various elements of the present invention have been shown to be conventional hydraulic pistons while clamps 30 and 32 are shown to be mechanical toggle clamps and with a spring rod mechanism. It is entirely possible that the actuators could be replaced by mechanical cam actuators and hydraulic actuators instead of the toggle clamps and spring loaded rod shown in the illustrated embodiment. The illustrated embodiment has been described in detail solely for the purposes of illustration and is not taken to restrict or limit the scope of the following claims.

We claim:

1. Improvements in a system for bag fill comprising an apparatus for filling and sealing flexible bags and bags configured for handling by said apparatus, said improvements in said apparatus comprising:

a fixed clamp secured to one corner of said bag;

a movable clamp secured to an opposing corner of said bag, said one and opposing corners being adjacent with the edge of said bag defined therebetween, said edge unsealed to permit filling of said bag through said edge;

first means for urging said movable clamp away from said one corner to maintain said edge closed and under tension during sealing of said edge;

a pair of suction cups;

second means for displacing said cups in mutually opposing directions along a common line substantially perpendicular to the plane defined by said bag when flat and unopened;

third means coupled to said second means for displacing said cups along an inclined line intersecting said common line at an angle to permit said cups to be displaced at least in part in a direction parallel to said plane defined by said bag when flat and unopened;

whereby said cups attach to a point on said bag are drawn apart and move in part horizontally as said bag is opened and as said point is horizontally displaced by the opening of the bag and whereby the seal imperfection rate of filled, flexible bags is substantially reduced.

2. The improvement of claim 1 comprising:

means for displacing said movable clamp toward said one corner to open said bag to facilitate filling.

3. The improvement of claim 1 further comprising:

a pair of squeeze bars at least one of said squeeze bars being movable toward the other said squeeze bar, said bag being filled with an air degradable material, said squeeze bars being arranged and configured to squeeze said bag to force said material upward toward an opening provided in the top of the bag;

whereby substantially all of the air included within said filled bag is expelled.

4. The improvement of claim 1 further comprising:

a pair of squeeze bars, at least one of said squeeze bars being movable toward the other said squeeze bar, said bag being filled with an air degradable material, said squeeze bars being arranged and configured to squeeze said bag to force said material upward toward an opening provided in the top of the bag;

wherein said edge is presealed except for a central segment, said clamps being secured on each side of said central segment through which central segment said bag is filled; and sealing means for hermetically sealing only said segment, whereby substantially all of the air included within said filled bag is expelled whereby sealing length is reduced and seal rejection rate substantially reduced.

5. The improvement of claim 1 further comprising:

sealing means for hermetically sealing only said segment, said corners being displaced toward each other to open said bag, said bag being formed of an inner and outer bag, said inner bag being unattached to said outer bag except where presealed and except where tacked at said segment, said innerr bag tacked to said outer bag at said central segment to permit a reliable and uniform opening of said bag; and means for displacing said movable clamp toward said one corner to open said bag to facilitate filling, whereby seal rejection rate substantially reduced, and whereby composite bags can be reliably filled.

6. The improvement of claim 1 wherein said edge of said bag is presealed except for a central segment through which segment each bag is filled, said corners being displaced toward each other to open said bag, said bag being formed of an inner and outer bag, said inner bag being unattached to said outer bag except where presealed and except where tacked at said segment, said inner bag being tacked to said outer bag at said central segment to permit reliable and uniform opening of said bag, whereby composite bags can be reliably filled and whereby the seal imperfection rate of filled, flexible bags is substantially reduced.

7. The improvement of claim 1 wherein said edge of said bag is presealed except for a central segment through which segment each bag is filled, said corners being displaced toward each other to open said bag, said bag being formed of an inner and outer bag, said inner bag being unattached to said outer bag except where presealed and except where tacked at said segment, said inner bag being tacked to said outer bag at said central segment to permit reliable and uniform opening of said bag; and means for displacing said movable clamp toward said one corner to open said bag to facilitate filling, whereby composite bags can be reliably filled and whereby the seal imperfection rate of filled, flexible bags is substantially reduced.

8. The improvement of claim 1 wherein said edge of said bag is presealed except for a central segment through which segment said bag is filled, said corners being displaced toward each other to open said bag, said bag being formed of an inner and outer bag, said inner bag being unattached to said outer bag except where presealed and except where tacked at said segment,said inner bag being tacked to said outer bag at said central segment to permit reliable and uniform opening of said bag; and means for displacing said movable clamp toward said one corner to open said bag to facilitate filling, whereby composite bags can be reliably filled.

9. The improvement of claim 1 wherein secured on said edge is presealed except for a central segment, said clamps being each side of said central segment through which central segment said bag is filled; and further comprising:

sealing means for hermetically sealing only said segment, whereby sealing length is reduced and seal rejection rate substantially reduced.

10. The improvement of claim 1 wherein said edge of said bag is presealed except for a central segment through which segment said bag is filled, said corners being displaced toward each other to open said bag, said bag being formed of an inner and outer bag, said inner bags being unattached to said outer bag except where presealed and except where tacked at said segment, said inner bag being tacked to said outer bag at said central segment to permit reliable and uniform opening of said bag, whereby composite bags can be reliably filled.

11. The improvement of claim 1 a pair of squeeze bars, at least one of said squeeze bars being movable toward the other said squeeze bar, said bag being filled with an air degradable material, said squeeze bars being arranged and configured to squeeze said bag to force said material upward toward an opening provided in the top of the bag;

wherein said edge of said bag is presealed except for a central segment through which segment said bag is filled, said corners being drawn toward each other to open said bag, said bag being formed of an inner and outer bag, said inner bag being unattached to said outer bag except where presealed and except where tacked at said segment, said inner bag being tacked to said outer bag at said central segment to permit reliable and uniform opening of said bag;

whereby composite bags can be reliably filled, whereby the seal imperfection rate of filled, flexible bags is substantially reduced, and whereby substantially all of the air included within said filled bag is expelled.

12. The improvement of claim 1 further comprising:

sealing means for hermetically sealing only said segment, said corners being displaced toward each other to open said bag, said bag being formed of an inner and outer bag, said inner bag unattached to said outer bag except where presealed and except where tacked at said segment, said inner bag being tacked to said outer bag at said central segment to permit a reliable and uniform opening of said bag;

whereby seal rejection rate substantially reduced, and whereby composite bags can be reliably filled.

13. An improvement in an apparatus for filling flexible bags comprising:

a pair of clamps secured to adjacent corners of said bag, said corners defining an edge therebetween, said edge being presealed except for a central segment through which segment said bag is filled, said corners being displaced toward each other to open said bag, said bag being formed of an inner and outer bag, said inner bag being unattached to said outer bag except where presealed and except where tacked at said segment, said inner bag being tacked to said outer bag at said central segment to permit reliable and uniform opening of said bag, whereby composite bags can be reliably filled.

14. The improvement of claim 13, further comprising:

a pair of suction cups;

first means for displacing said cups in mutually opposing directions along a common line substantially perpendicular to the plane defined by said bag when flat and unopened;

second means coupled to said first means for displacing said cups along an inclined line intersecting said common line at an angle to permit said cups to be displaced at least in part in a direction parallel to said plane defined by said bag when flat and unopened, whereby said cups attach to a point on said bag, are drawn apart, and move in part horizontally as said bag is opened and as said point is horizontally displaced by the opening of said bag.

15. An improvement in an apparatus for filling flexible bags comprising:

a pair of suction cups;

first means for displacing said cups in mutually opposing directions along a common line substantially perpendicular to the plane defined by said bag when flat and unopened;

second means coupled to said first means for displacing said cups along an inclined line intersecting said common line at an angle to permit said cups to be displaced at least in part in a direction parallel to said plane defined by said bag when flat and unopened, whereby said cups attach to a point on said bag, are drawn apart, and move in part horizontally as said bag is opened and as said point is horizontally displaced by the opening of said bag.

* * * * *